United States Patent
McBride, Jr. et al.

[15] 3,663,876
[45] May 16, 1972

[54] MOTOR CONTROL SYSTEM UTILIZING A HIGH INDUCTANCE CAPACITOR

[72] Inventors: Lyle E. McBride, Jr., Norton; Daniel R. Pimentel, Seekonk, both of Mass.

[73] Assignee: Texas Instruments Incorporated, Dallas, Tex.

[22] Filed: Nov. 4, 1970

[21] Appl. No.: 86,660

[52] U.S. Cl. .................. 318/221 D, 318/221 E, 318/225 R, 317/260, 318/227
[51] Int. Cl. ............................................. H02p 1/44
[58] Field of Search .......... 318/220 R, 221 R, 221 D, 221 E, 318/225 R, 227; 317/256, 260

[56] References Cited

UNITED STATES PATENTS

| | | | |
|---|---|---|---|
| 3,215,910 | 11/1965 | Schilling | 317/256 X |
| 1,707,424 | 4/1929 | Bailey | 318/221 D |
| 2,027,067 | 1/1936 | Schubert | 317/260 X |
| 3,258,668 | 6/1966 | Milligan | 318/221 R |
| 2,593,987 | 4/1952 | Courtney et al. | 318/221 D |
| 2,298,131 | 10/1942 | Johns | 318/221 D |
| 3,528,103 | 9/1970 | Wolf | 318/221 R |

Primary Examiner—Gene Z. Rubinson
Attorney—Harold Levine, Edward J. Connors, Jr., John A. Haug, James P. McAndrews and Gerald B. Epstein

[57] ABSTRACT

A control system is disclosed in which a selectively energizable load such as one or more motor windings are coupled to a source of power by a high inductance capacitor through a selectively energizable switch means. The capacitor is arranged such that it has a relatively significant value of resistance or inductance sufficient to limit the rate of energy transfer therethrough and hence through the switch means upon charging and discharging so as to protect the switch means against potentially adverse affects of high rates of energy transfer therethrough.

12 Claims, 8 Drawing Figures

Patented May 16, 1972

INVENTOR.
Lyle E. McBride Jr.
BY Daniel R. Pimentel

Gerald B. Epstein  Att'y.

INVENTOR.
Lyle E. McBride Jr.
BY Daniel R. Pimentel

Gerald B. Epstein Att'y.

MOTOR CONTROL SYSTEM UTILIZING A HIGH INDUCTANCE CAPACITOR

The present invention relates generally to control systems and more particularly is directed to control systems in which capacitors having significant values of resistance or inductance are utilized for limiting rates of energy transfer.

In recent years, a myriad of control systems have been developed for selectively supplying power to a load. Particularly in the industrial control field, numerous control systems have been developed for selectively applying electrical power to motor windings. Typically, such control systems may employ electro-mechanical relays, semiconductor switching devices, etc. for controlling the application of electrical energy to the motor windings. However, in such control systems, capacitors are often utilized in order to establish a requisite phase relationship between the motor windings in order to effect starting or for purposes of power factor correction in accordance with utility company requirements, etc. The introduction of capacitors in such a system may pose formidable difficulties in view of the strain on the switching devices which may be imposed due to extremely rapid rates of energy transfer resulting from the connection of an initially discharged capacitor to a source of electrical power or similarly, upon the discharge of a charged capacitor in response to closing of an open switch. For example, in effecting starting or stopping of a motor, utilizing certain control systems, the closing of an initially open switch may result in the connection of an initially charged capacitor to a discharged capacitor, accompanied by a high rate of energy transfer. The relatively high rates of energy transfer which may occur in such instances, may severely affect the electrical lifetime characteristics of associated switching devices. For example, when electro-mechanical relays are utilized in such circumstances, sparking between the contacts and eventual contact erosion may occur, necessitating frequent contact replacement, the contacts may become welded together necessitating replacement of all or part of the relay, etc. Similarly, when semi-conductor switching devices are utilized, high energy current surges may effect rapid destruction of the semiconductor device due to its limited energy dissipation capability. In certain instances in order to partially alleviate such difficulties, relatively expensive, heavy duty switching devices may be utilized capable of handling the energy surges generated, whereas the electrical characteristics of the switch device absent the necessity for handling the high energy surges may be several orders of magnitude lower, permitting the use of relatively inexpensive light duty switching devices. In addition, in certain instances, it has proven necessary to provide additional energy dissipation networks for handling the energy surges, thereby introducing additional expense and complexity.

Accordingly, it is an object of the present invention to provide an improved control system.

It is another object of the present invention to provide an improved control system in which switch devices within the system are protected against the effects of high rates of energy transfer.

It is a further object of the present invention to provide an improved motor control system in which substantially improved durability is achieved by protecting various elements within the system against the potentially harmful affects of high rates of energy transfer.

Various additional objects and advantages of the present invention will be readily apparent from the following detailed description and accompanying drawings wherein.

In the following description, similar elements are indicated by the same reference numerals throughout the various views in the drawings.

Very generally, in accordance with the principles of the present invention, various electrical control systems are illustrated for selectively energizing a load through a switch means in which a capacitor structure is selectively connected between the load and a source of power, the capacitor having a predetermined resistance or inductance sufficient to substantially reduce the rate of energy transfer through the switch device upon operation thereof. The rate of energy transfer upon operation of the switch means due to charging of the initially uncharged capacitor or due to discharge of residual energy stored in the capacitor is limited by the capacitor, thereby protecting the switch device against potentially harmful effects of high energy transfer rates so as to minimize switching device failures and substantially enhance the durability of the system.

Figure 1:
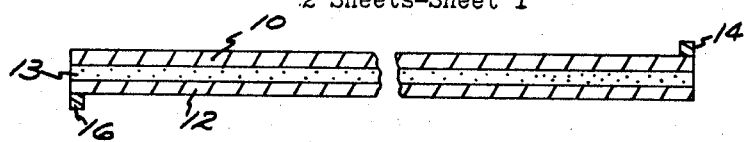
FIG. 1 is a sectional view of a capacitor structure utilized in a system in accordance with the present invention at a preliminary state of construction.

Referring initially to FIG. 1, a capacitor structure such as that contemplated for use in a system in accordance with the present invention is illustrated at a preliminary stage of manufacture. The capacitor structure includes a pair of generally elongated conductive plates 10, 12, separated by a suitable dielectric medium 13 disposed intermediate the conductive plates and further including a pair of contacts 14, 16 arranged at the exposed surfaces of each of the conductive plates 10, 12 respectively. In accordance with an important feature of the present invention and contrary to the usual practice in the capacitor art, the contacts 14, 16 are not arranged in symmetrical facing relationship at opposed surfaces of the conductive plates 10, 12. Instead, the contacts are disposed in mutually spaced relationship on opposed surfaces of the plates, but adjacent opposed edges of the respective plates so as to maximize the separation between the contacts 14, 16. Such an arrangement is in direct contrast to the conventional practice in the capacitor art which would dictate arranging the contacts in facing symmetrical relationship with respect to each other so as to minimize the resistance and inductance of the capacitor structure. In a capacitor, such as that shown in FIG. 1, the plates may be fabricated of a conductive foil, while the dielectric may comprise paper, mica, etc. depending upon the capacitance value desired and the contacts may be fabricated of aluminum, silver, etc.

Figure 2:
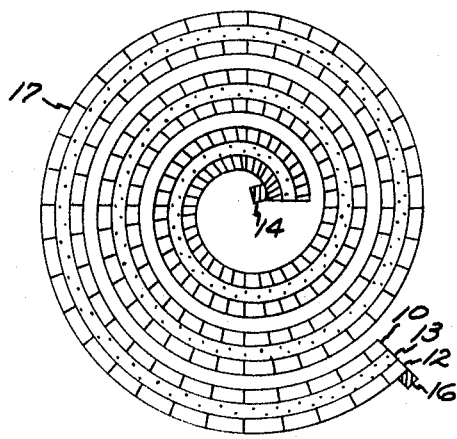
FIG. 2 is a sectional view of the capacitor of FIG. 1 at a subsequent stage of construction.

In order to complete the fabrication of a capacitor structure in accordance with the present invention, the structure illustrated in FIG. 1 is wound about a common axis in a spiral configuration to define the device illustrated in FIG. 2, this resultant capacitor structure being indicated by the reference numeral 17. By virtue of the particular configuration of the capacitor unit 17 illustrated in FIG. 2, a significant amount of inductance is provided in addition to the increased resistance due to the maximized separation between the contacts 14, 16. Thus, although conventional practice in the capacitor art dictates the provision of a capacitor structure having an essentially pure capacitance with a nil value of inductance and an extremely low resistance level, it may be seen that the capacitor unit 17 has properties which are directly contrary to conventional practices. Accordingly, the capacitor unit 17, illustrated in FIG. 2, is hereinafter referred to as a high inductance capacitor.

In Table I, set forth hereinafter, the characteristics of a number of typical capacitor samples arranged in a configuration such as the unit 17 illustrated and described in connection with FIG. 2 are set forth in detail. As will be seen from Table I, the capacitance of these various samples is approximately 10 microfarads, while the resistance of these capacitor samples is of the order to 3.7 ohms and the inductance value is approximately 1 microhenry. Such results may be compared with conventional 10 microfarad capacitors in which the inductance value is essentially nil.

TABLE I

| Sample | C (microfarads) at 25° C., at 60 Hz. | $I_o$ (RMS amps) | $V_o$ (RMS volts) | $R_o$ (ohms) | Resonant f, Hz. | L (microhenries) |
|---|---|---|---|---|---|---|
| 1 | 10.08 | 0.805 | 3.0 | 3.72 | 1,530 | 1.07 |
| 2 | 10.08 | 0.820 | 3.0 | 3.66 | 1,550 | 1.05 |
| 3 | 9.99 | 0.805 | 3.0 | 3.72 | 1,540 | 1.08 |
| 4 | 10.13 | 0.805 | 3.0 | 3.72 | 1,555 | 1.04 |

Figure 3:
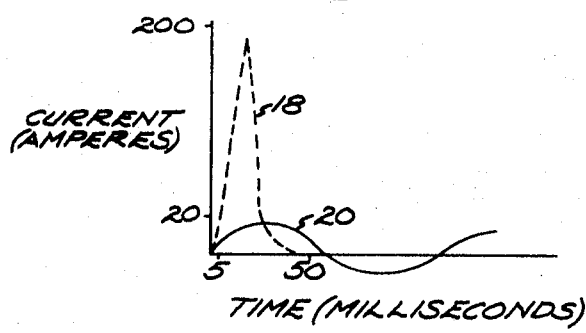
FIG. 3 is a graphical illustration of the improved energy transfer characteristics which may be achieved in accordance with the present invention.

As a result of the inductance of such a capacitor unit, a substantial and drastic reduction in the energy transfer characteristics, i.e., the $di/dt$ characteristics is achieved in comparison with a conventional capacitor structure, as particularly shown in FIG. 3. FIG. 3 graphically illustrates the current discharge characteristics of a conventional capacitor structure in the curve indicated by the reference numeral 18, as compared with the discharge characteristics of a capacitor unit, such as that illustrated in FIG. 2, which is shown in the curve indicated by the reference numeral 20. Thus, it may be seen that the utilization of a capacitor unit such as that shown in FIG. 2 gives rise to the possibility of substantially limiting the potentially harmfully high rates of energy transfer caused by capacitors utilized in motor control systems for example. When electromechanical relays are utilized in such systems, problems of contact wear, contact welding, etc., which may occur upon contact closure is prevented, while in those instances wherein various semiconductor switch devices which are extremely susceptible to high rates of energy transfer (high $di/dt$) are utilized, a similar form of protection is provided.

Figure 4:
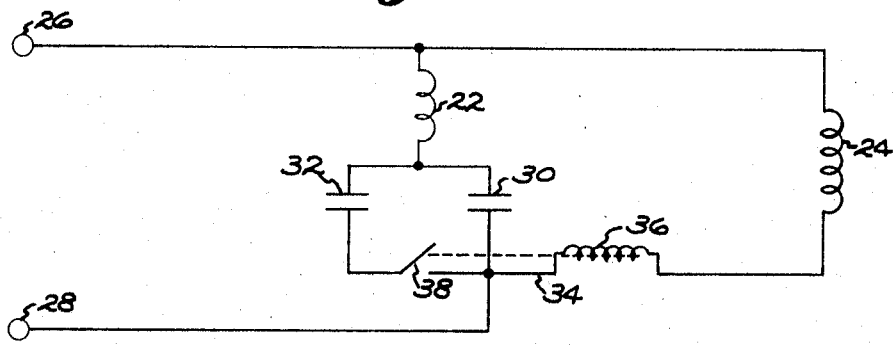
FIG. 4 is a schematic circuit diagram of a motor control system in accordance with the present invention.

Accordingly, referring to FIG. 4, a typical capacitor-start, capacitor-run motor control system is illustrated, utilizing a capacitor unit 17, such as that illustrated in FIG. 2. More particularly, the illustrated system includes a start winding 22 and a run winding 24 coupled to a power supply (not shown) through a pair of power supply terminals 26, 28. The system further includes a run capacitor 30 which preferably comprises a high inductance capacitor structure, such as the unit 17 illustrated in FIG. 2, coupled to the start winding 22 and a start capacitor 32, also coupled to the start winding 22. In addition, a selectively energizable current switch 34 is provided intermediate the start capacitor 32 and power supply terminal 28, for selectively connecting the start capacitor 32 to the power supply and for selectively connecting the start capacitor 32 to the power supply terminal 28. In the illustrated embodiment, the switch means 34 preferably comprises a normally open current switch adapted to be closed upon initial energization of the motor and opened during running of the motor. Thus, the start capacitor 32 is energized for a predetermined time interval during starting of the motor so as to effect the desired phase relationship between the motor windings 22, 24, to produce maximum torque during starting, while the switch 34 is adapted to re-open so as to disconnect the start capacitor 32 from the power supply during running of the motor. As shown, the switch 34 preferably comprises a selectively energizable relay coil 36 operatively connected to a pair of normally open relay contacts 38. The relay coil 36 is connected between the run winding 24 and the power supply terminal 38 so that it may receive maximum current upon initial energization of the system while the contacts 38 are arranged intermediate the start capacitor and the run capacitor 30 and the power supply for connecting the start capacitor 32 to the power supply terminal 28, as well as for connecting the start capacitor to the run capacitor, upon closure of the contacts.

In operation of the system illustrated in FIG. 4 upon energization of the motor windings 22, 24 by the application of AC power across the terminals 26, 28, a current path is initially established through the run winding 24 and hence through the relay coil 36 since the motor is initially in a locked rotor state on the initiation of a starting cycle. This current flow energizes relay coil 36 and effects closure of the relay contacts 38 so as to couple the start capacitor 32 to power supply terminal 28 to effect charging thereof and permit energization of the start winding 22 and establishment of the requisite phase relationship between the motor windings in order to effect starting of the motor. In this regard, upon closure of the contacts 38, the initially discharged start capacitor 32 is connected to the run capacitor 30 which has been charged by the power supply, and ordinarily, discharging would be initiated at a relatively rapid rate producing a high instantaneous current transfer through the relay contacts 38 prior to effecting complete closure thereof. Such an effect is particularly pronounced in a situation in which a charged capacitor is connected to a discharged capacitor, as in the illustrated embodiment. Accordingly, the relay contacts would be exposed to a severe and possibly hazardous electrical environment requiring some provision for minimizing affects of contact damage due to sparking across the contacts in view of the extremely high rate of energy transfer thereacross. However, since the run capacitor 30 comprises a high inductance capacitor unit, as previously explained, run capacitor 30 does not generate a high rate of energy transfer across the relay contacts 38 due to its inductance. Thus, the relay contacts 38 are provided with a substantial degree of protection against potentially harmful high rates of energy transfer thereacross. Furthermore, the run capacitor 30 functions as a conventional capacitor in terms of improving motor efficiency by aiding in establishing the requisite phase relationship between the motor windings during normal motor running, while limiting energy transfer across the relay contacts 38. It may be also noted in this regard that the inductance of run capacitor 30 has an essentially negligible effect on the conventional 60 hz power supplied for energizing the motor, but only affects the high frequency energy transients produced upon switch closure. As motor speed increases and normal running speed is approached, insufficient current continues to flow through the relay coil 36 to maintain the relay coil energized and accordingly, the contacts 38 re-open so as to disconnect the start capacitor 32 from the system during running of the motor and thereby prepare the system for a subsequent start cycle.

Figure 5:
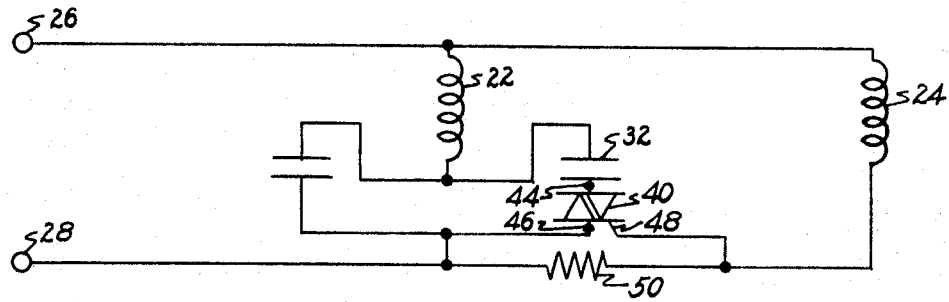
FIG. 5 is a schematic circuit diagram of a motor control system similar to that illustrated in FIG. 4.

Referring now to FIG. 5, another embodiment of a system similar to that illustrated in FIG. 4 is shown in which a different type of current switch means 40 is employed for selectively connecting the start capacitor 32 to the start winding 22 during starting of the motor. This system similarly includes the run winding 24, the run capacitor 30, and power supply terminals 26, 28 for supplying electrical power to the system. The starting and running operation of the system shown in FIG. 5 is quite similar to that illustrated and described in connection with FIG. 4 except that the switch means 40 preferably comprises a triac having a pair of power terminals or anodes 44, 46 and a gate 48. The triac anodes 42, 44 are connected between the start capacitor 32 and the power supply terminal 28 so as to effect connection of the start capacitor 32 to the power supply terminals, and also function to selectively connect the start capacitor across the run capacitor in response to the application of a trigger signal to the gate 48, rendering the triac conductive. In this regard, a voltage dropping gate resistor 50 is provided between the terminal 28 and the run winding 24. The gate 48 is connected between the gate resistor 50 and the run winding 24 so that tripper signals may be applied to the gate 48 upon starting of the motor, when full current passes through the run winding and hence through the gate resistor, establishing a sufficient voltage drop across the gate resistor to trigger the triac into conduction. Similarly, upon the expiration of a predetermined time interval required for running of the motor to be effected, insufficient triggering current continues to flow through the run winding to maintain the triac conductive and the start capacitor 32 is disconnected from the system. The run capacitor 30 in this embodiment again comprises a high inductance capacitor such as the capacitor unit 17, illustrated in FIG. 2, and, as previously explained, is adapted to limit the rate of energy transfer through the triac switch 40, when the start capacitor 32 is connected across the run capacitor 30 upon conduction of the triac 40. The operation of the system illustrated in FIG. 5 is essentially similar to the system illustrated in FIG. 4. Upon the application of power to the motor windings 22, 24, full current initially flows through the run winding 24 and through the voltage dropping gate resistor 50 so that a substantial voltage drop is established between the gate 48 and anode 46 of the triac 40 sufficient to render the triac conductive. As a result of conduction of the triac, the initially discharged start capacitor 32 is connected between the start winding 22 and the power supply terminal 28 and is also connected across the high inductance run capacitor 30 so as to permit the establishment of the requisite phase relationship between the start winding 22 and the run winding 24. As a result of the utilization of the high inductance run capacitor, a potentially harmful energy transfer across the triac 40 is prevented upon the initiation of conduction thereof and connection of the initially discharged start capacitor to the charged run capacitor 30. It may be noted that the initiation of conduction of the triac and hence the prevention of potentially harmful energy transfer occurs repetitively during each half cycle of applied AC power during the starting cycle. As the motor approaches running speed the current flowing through the run winding and thus through the gate resistor 50 becomes insufficient to maintain the voltage drop across the gate resistor 50 at the level required to maintain the triac 40 conductive. Once the triac 42 is rendered non-conductive, the start capacitor 32 is disconnected from the system, and the motor continues to run in the usual fashion, while the start capacitor 32 and the non-conductive triac 40 remain de-energized for initiating a subsequent starting cycle.

Thus, it may be seen that FIGS. 4 and 5 illustrate the provision of several motor control systems in which various current switch devices are utilized for selectively energizing the start capacitor during starting of the motor with the current switch devices being protected against potentially harmful effects of high energy transfer rates upon discharge of the high inductance run capacitor due to the construction and electrical characteristics of the run capacitor unit employed. As a result, substantially less expensive relays may be utilized for switching in view of the significantly reduced energy transfer rates and, similarly, various types of semiconductor switching devices, such as triacs, may be utilized without fear of electrical destruction in view of the limited energy transfer rates.

Figure 6:
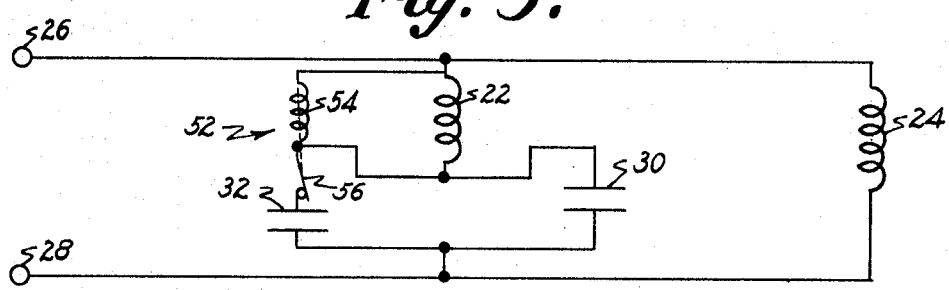
FIG. 6 is a schematic circuit diagram of an alternative embodiment of a motor control system in accordance with the present invention.
Figure 7:
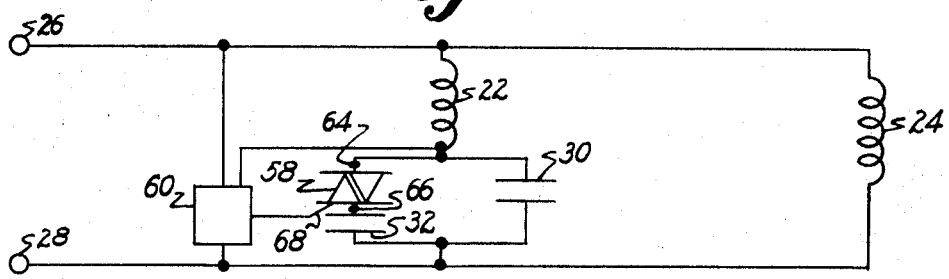
FIG. 7 is a schematic circuit diagram of a motor control system similar to that illustrated in FIG. 6.

In certain instances, it is desirable to utilize voltage sensitive switching devices in motor control systems similar to those illustrated in FIGS. 4 and 5. Several embodiments of typical systems utilizing voltage sensitive switches are shown in FIGS. 6 and 7. Referring initially to FIG. 6, a capacitor-start, capacitor-run motor control system is shown including start winding 22 and run winding 24 adapted to be energized by the application of electrical power across power supply terminals 26, 28. In addition, the high inductance run capacitor 30 is provided and the start capacitor 32 is again selectively connectable between the start winding 22 and the source of electrical power.

In the embodiment illustrated in FIG. 6, a voltage sensitive switch means 52 is provided for respectively connecting and selectively disconnecting the start capacitor 32 from the start winding 22 during initial energization and upon running of the motor. The switch means 52 preferably comprises a selectively energizable relay coil 54 connected across the start winding 22 and operatively connected to a pair of normally closed relay contacts 56, which connect the start winding 22 to the start capacitor 32. As a result of this arrangement of the switch means 52, prior to energization of the motor, the relay contacts 56 are maintained in a closed condition. Thus, upon energization of the motor and application of power to the windings 22, 24, operation of the switch means 52 is not required to initiate the establishment of the requisite phase relationship between the start winding 22 and the run winding 24 in order to effect starting of the motor. However, as running speed of the motor is approached, the switch means 52 is operated to effect disconnection of the start capacitor from the start winding. If the relay contacts momentarily re-close and re-open (contact bounce) during this operation, an energy transfer across the switch means takes place as a result of the different voltage levels respectively established across the start capacitor 32 and the run capacitor 30. This phenomenon may also occur when the switch means is caused to re-close due to motor loading and when the circuit is de-energized to stop the motor. The rate of energy transfer is severely limited so as to protect the switch means by selecting as the run capacitor 30 a high inductance capacitor such as the capacitor unit 17 illustrated and described in connection with FIG. 2. In operation of the FIG. 6 embodiment upon the initiation of a starting cycle, voltage level provided by the power supply is initially established across the run winding 24 and a relatively low voltage level is initially established across the start winding 22 so that the relay coil 54, which is connected across the start winding, remains in an unenergized state. The relay contacts 56 remain closed, while the relay coil 54 is unenergized and the start capacitor 32 remains connected to the start winding to permit starting of the motor to occur. As the motor approaches normal running speed, an increased voltage level is induced across the start winding 22 and hence across the relay coil 54, effecting energization of the relay coil 54 and consequent opening of the relay contacts 56, thereby disconnecting the start capacitor 32 from the start winding 22. It may be seen that a substantial amount of residual energy may remain stored in the start capacitor 32, when the relay contacts 56 are opened. However, this energy is dissipated and the rate of energy transfer across the relay contacts is substantially limited upon closure of the contacts, and possible harm due to contact bounce is prevented since the run capacitor 30 which is connected to the start capacitor 32 upon contact closure comprises a high inductance capacitor, such as the capacitor unit 17 illustrated in FIG. 2. Accordingly, the high inductance run capacitor 32 may be smoothly disconnected from the start winding as the motor approaches normal running speed, and the relay coil 54 remains energized as a result of the voltage induced across the start winding 22 during running of the motor, while the contacts 56 remain in an open position until sufficient slowing of the motor due to loading or due to de-energization of the motor is effected to de-energize the relay coil 54 and effect contact closure. Similarly, in view of the limited energy transfer the contacts are permitted to close without attendant problems of high current surges accompanied by possible contact wear, welding, etc., which could occur if a conventional run capacitor were employed.

Referring now to FIG. 7, another embodiment of a motor control system similar to that illustrated in FIG. 6 is show, employing a different switch means 58 for effecting connection and disconnection of the start capacitor 32 from the start winding 22. More particularly, in this embodiment the start winding 22 and run winding 24 are similarly connected to the power supply terminals 26, 28, while the high inductance run capacitor 30 is connected to the start winding 22 and the start capacitor 32 is selectively connected to the start winding through the switch means 58 which is maintained in a conductive state during starting of the motor so as to maintain the start capacitor 32 connected to the start winding until the motor reaches running speed. In addition, a suitable switch energizing means 60 is coupled to the switch means 58 and is also connected across the start winding 22 for initially maintaining the switch means 58 in a conductive state upon initial energization of the motor and for sensing the voltage developed across the start winding as running speed is approached so as to effect de-energization of the switch means 58 in order to disconnect the start capacitor 32. The switch means 58 preferably comprises a semiconductor switch device, such as a triac, having a pair of anodes 64, 66 and a gate 68 which is connected to the switch energizing means 60 for receiving trigger signals therefrom. If desired, the switch energizing means 60 may be arranged to sense changes in impedance of the start winding or the run winding or it may be arranged to operate the switch means 58 after a predetermined time interval, etc. However, in the illustrated embodiment, the switch energizing means 60 comprises a suitable trigger circuit which is connected across the start winding 22 for sensing the voltage developed thereacross and supplying trigger signals to the gate 68 in accordance therewith. More particularly, the anodes 64, 66 of the triac 58 are connected between the start winding 22 and the start capacitor 32, and also between the start capacitor 32 and the run capacitor 30 so as to connect the start capacitor 32 and the run capacitor 30, when the triac is rendered conductive. Conduction of the triac is controlled by the trigger circuit 60 which, as shown, is connected across the start winding 22 for sensing the voltage developed thereacross and is also connected across the power supply terminals 26, 28. The trigger circuit 60 supplies trigger signals to the gate 68 of the triac 58 so as to maintain the triac conductive and hence maintain the run capacitor 30 connected to the start capacitor 32 and to maintain the start capacitor 32 connected to the start winding 22 during starting of the motor. In operation, the trigger circuit 60 senses the increased voltage established across the start winding 22 as running speed is approached and is arranged to discontinue the application of trigger signals to the gate 68 in response thereto so as to render the triac non-conductive and disconnect the start capacitor 32 from the run capacitor 30 and from run winding 22, when the motor is running. Similarly, when motor speed decreases due to loading of the motor or upon de-energization of the motor, the trigger circuit senses the decreased voltage level across the start winding 22 and re-applies trigger signals to trigger the triac 58 into conduction, thereby connecting the run capacitor to the start capacitor. Since the run capacitor is connected to the start capacitor upon triac conduction, and these capacitors may in general each be charged to different voltage levels, a high current surge could pass through the triac, but is prevented by the utilization of a high inductance run capacitor as previously explained. The provision of the high inductance run capacitor is particularly advantageous in this embodiment since the triac 58 is triggered into conduction at each half cycle of applied AC power. However, the high inductance run capacitor 30 functions to limit the rate of energy transfer through the triac upon triggering into conduction thereof and thus protects the triac against damage.

Figure 8:
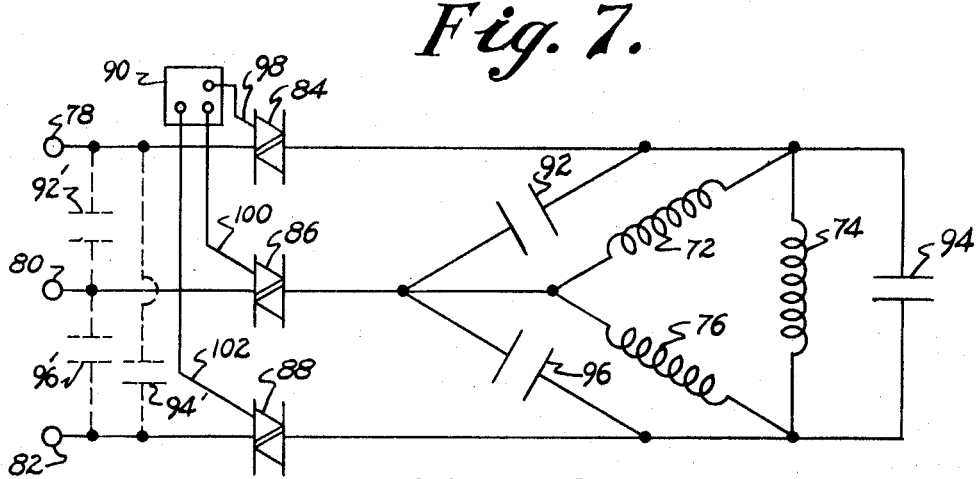
FIG. 8 is a schematic circuit diagram of a polyphase motor control system in accordance with the principles of the present invention.

Referring now in detail to FIG. 8, another embodiment of a motor control system embodying the principles of the present invention is illustrated. In this embodiment, a polyphase motor control system is illustrated. A plurality of windings 72, 74, and 76 are shown interconnected in a delta configuration, although other types of configurations may be utilized if desired. A plurality of power supply terminals 78, 80, and 82 are provided and selectively connected to the motor windings through appropriate switching devices 84, 86, and 88 respectively, which control the application of power across the motor windings. In addition, a switch energizing circuit 90 is provided coupled to the switch devices 84, 86, and 88 in order to control the energization thereof. Furthermore, a plurality of power factor correction capacitors 92, 94, and 96 are provided with one of the capacitors being connected across each one of the motor windings 72, 74 and 76 respectively, as shown. In addition, another set of power factor correction capacitors 92', 94', and 96' are shown in phantom indicative of the frequent industrial situation in which more than one motor is energized from a common bus. The use of power factor correction capacitors has become extremely prevalent in recent years in view of utility company requirements, as well as the cost savings which may be possible in distribution circuits when all loads approach a unity power factor. However, certain problems may arise in connection with the operation of a motor control system, in view of the possibility of the occurrence of relatively large surges of current upon initial energization of the motor control system and connection of the capacitors to the power source and to other capacitors which have been previously connected to the power source and are in a charged state since associated switching devices may be easily damaged by the surges of current which may occur under such circumstances. Thus, in accordance with the principles of the present invention, each of the capacitors 92, 94, and 96 comprises a high inductance capacitor such as the unit 17 shown and described in connection with FIG. 2 so as to minimize the rate of energy transfer through associated switching devices upon connection of the capacitors from a source of power or to other previously charged capacitors. Accordingly, the switching devices 84, 86, and 88 in the illustrated embodiment may comprise semiconductor switching devices, such as triacs, although various other switching devices, such as relays, silicon controlled rectifiers, etc., could be readily utilized if desired. As shown, each of the triacs 84, 86 and 88 includes a gate terminal 98, 100, and 102 respectively connected to the switch energizing circuit 90 which serves to supply trigger signals to the respective gate terminals in order to effect energization of the triacs. Thus, upon energization of the system and connection of the capacitors 92, 94, and 96 to the power supply and/or to a set of previously charged capacitors, such as the capacitors 92', 94', and 96' shown in phantom, the respective triacs are triggered into conduction and power is supplied to the motor windings. Since all of the power factor correction capacitors comprise high inductance units, as previously described, high rates of energy transfer through the switching triacs which could occur absent such a provision is prevented, and an extremely durable system is provided in which the switching devices are protected from potentially harmful high rates of energy transfer.

Thus, several examples of control systems have been described in which high resistance inductance capacitor units are employed so as to prevent the occurrence of high rates of energy transfer which could cause damage to associated switching devices utilized.

Various changes and modifications in the above-described embodiments will be readily apparent to those skilled in the art and any such changes or modifications are deemed to be within the spirit and scope of the appended claims.

We claim:

1. In a motor control system including a main winding, a start winding, a start capacitor and a selectively energizable switch means, a high inductance run capacitor selectively coupled to said start capacitor through said switch means, said high inductance run capacitor having a predetermined inductance sufficient to substantially limit the rate of energy transfer across said switch means upon operation of said switch means, thereby preventing the occurrence of potentially harmful energy transfer across said switch means, said switch means comprising a normally open current switch adapted to close in response to energization of the motor, so as to connect said high inductance run capacitor to said start capacitor only for a predetermined time interval and including a relay having a selectively energizable relay coil connected to said run winding and adapted to be energized in response to energization of said run winding and a pair of normally open relay contacts operatively connected to said relay coil, said contacts being arranged intermediate the high inductance run capacitor and the start capacitor and coupleable to the source of electrical power, and being adapted to be closed in response to energization of said relay coil so as to effect connection between said high inductance run capacitor and said start capacitor and to permit energization of said start winding accompanied by limited instantaneous energy transfer across said relay contacts.

2. In a system in accordance with claim 1 wherein said high inductance capacitor comprises a pair of elongated conductive plates separated by a dielectric medium disposed therebetween and an electrical contact at the surface of each of said conductive plates opposed to said dielectric medium, said contacts being disposed in mutually spaced relationship adjacent opposed edges of said conductive plates to maximize the separation between said contacts, said elongated conductive plates being arranged in a spirally wound configuration.

3. In a motor control system including a main winding, a start winding, a start capacitor and a selectively energizable switch means, a high inductance run capacitor selectively coupled to said start capacitor through said switch means, said high inductance run capacitor having a predetermined inductance sufficient to substantially limit the rate of energy transfer across said switch means upon operation of said switch means, thereby preventing the occurrence of potentially harmful energy transfer across said switch means, a semiconductor switch having a pair of power terminals connected between the start capacitor and the source of electrical power and arranged intermediate the start capacitor and the run capacitor and having a gate terminal coupled to said run winding and adapted to receive trigger signals to render said semiconductor switch conductive in response to energization of said run winding, thereby effecting the connection of said start capacitor to said high inductance run capacitor through said power terminals accompanied by a limited instantaneous energy transfer through said semi-conductor switch.

4. In a system in accordance with claim 3 wherein said semiconductor switch comprises a triac, said power terminals comprise the anodes of said triac, and said gate terminal comprises the gate of said triac.

5. In a system in accordance with claim 4 wherein said high inductance capacitor comprises a pair of elongated conductive plates separated by a dielectric medium disposed therebetween and an electrical contact at the surface of each of said conductive plates opposed to said dielectric medium, said contacts being disposed in mutually spaced relationship adjacent opposed edges of said conductive plates to maximize the separation between said contacts, said elongated conductive plates being arranged in a spirally wound configuration.

6. In a motor control system including a main winding, a start winding, a start capacitor and a selectively energizable switch means, a high inductance run capacitor selectively coupled to said start capacitor through said switch means, said high inductance run capacitor having a predetermined inductance sufficient to substantially limit the rate of energy transfer across said switch means upon operation of said switch means, said switch means comprising a normally closed potential switch adapted to open after a predetermined time interval subsequent to energization of said start winding to effect disconnection of said high inductance run capacitor from said start capacitor and to re-close in response to reduced energization of said start winding, thereby effecting reconnection of said high inductance run capacitor and said start capacitor through said potential switch, the rate of discharge through said potential switch being limited by the inductance of said high inductance run capacitor so as to prevent the occurrence of a potentially harmful rate of energy transfer across said potential switch.

7. In a system in accordance with claim 6 wherein said potential switch comprises a relay including a selectively energizable relay coil connected across said start winding, said relay coil being adapted to be energized in response to the establishment of a preselected voltage across said start winding subsequent to energization of the motor and being adapted to be de-energized in response to the de-energization of the motor and a pair of normally closed relay contacts operatively connected to said relay coil, said contacts being connected intermediate said high inductance run capacitor and said start capacitor and being adapted to be opened in response to the establishment of said preselected voltage upon energization of the motor and to be re-closed in response to a reduced energization of said start winding so as to effect reconnection between said high inductance run capacitor and said start capacitor accompanied by a limited transfer of energy across said contacts.

8. In a system in accordance with claim 6 wherein said potential switch comprises a normally conductive semi-conductor switch having a pair of power terminals connected between said high inductance run capacitor and said start capacitor and having a gate terminal adapted to receive trigger signals for controlling the conduction of said semiconductor switch, and means coupled to said gate terminal for maintaining said semiconductor switch in a conductive state upon initial energization of the motor, for maintaining said semiconductor switch non-conductive during running of the motor, and for rendering said semiconductor switch conductive in response to reduced energization of said start winding so as to effect a limited rate of energy transfer between said high inductance run capacitor and said start capacitor through said semiconductor switch upon conduction thereof in response to conduction of said semiconductor switch.

9. In a system in accordance with claim 8 wherein said semiconductor switch comprises a triac, said gate terminal comprises the gate of the triac, said power terminals comprise the anodes of the triac and the high inductance run capacitor is arranged to discharge residual energy stored therein at a rate within the conduction capabilities of the triac.

10. In a system in accordance with claim 9 wherein said high inductance capacitor comprises a pair of elongated conductive plates separated by a dielectric medium disposed therebetween and an electrical contact at the surface of each of said conductive plates opposed to said dielectric medium, said contacts being disposed in mutually spaced relationship adjacent opposed edges of said conductive plates to maximize the separation between said contacts, said elongated conductive plates being arranged in a spirally wound configuration.

11. In a polyphase motor control system including a plurality of motor windings and switch means connecting said respectively windings to a source of electrical power, a power factor correction capacitor connected across each of said motor windings and coupled to said switch means, each of said power factor correction capacitors comprising a high inductance capacitor having a predetermined inductance sufficient to substantially limit the rate of energy transfer through said switch means during charging and discharging of said capacitors upon energization of the motor windings, said switch means comprising a semiconductor switch connected between each of said windings and the source of power, each of said semiconductor switches including a pair of power terminals connected between the source of electrical power and one of the motor windings and its associated high inductance power factor correction capacitor.

12. In a polyphase motor control system in accordance with claim 11 wherein each of said semiconductor switches comprises a triac having its anodes connected between the source of power and one of said motor windings and its associated high inductance power factor correction capacitor and each of said high inductance power factor correction capacitors comprises a pair of elongated conductive plates separated by a dielectric medium and an electrical contact at the surface of each of said conductive plates opposed to said dielectric medium, said contacts being disposed in mutually spaced relationship adjacent opposed edges of said conductive plates to maximize the separation between said contacts, said elongated conductive plates being arranged in a spirally wound configuration.

* * * * *